US012629848B2

(12) United States Patent
Liu et al.

(10) Patent No.: US 12,629,848 B2
(45) Date of Patent: May 19, 2026

(54) VACUUM TIP ASSEMBLY FOR USE IN PICK-AND-PLACE TOOL

(71) Applicant: TAIWAN SEMICONDUCTOR MANUFACTURING COMPANY, LTD., Hsinchu (TW)

(72) Inventors: Ching Hsien Liu, Hsinchu (TW); Sheng-Po Tseng, Hsinchu (TW); Chen Liang Chang, Hsinchu (TW); Chin-Szu Lee, Hsinchu (TW); Yi Chen Ho, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 395 days.

(21) Appl. No.: 18/131,064

(22) Filed: Apr. 5, 2023

(65) Prior Publication Data

US 2024/0335957 A1 Oct. 10, 2024

(51) Int. Cl.
B65G 47/91 (2006.01)
B25J 15/06 (2006.01)

(52) U.S. Cl.
CPC .......... B25J 15/0616 (2013.01); B65G 47/91 (2013.01)

(58) Field of Classification Search
CPC .............................. B25J 15/0616; B65G 47/91

USPC ........................................................ 156/538
See application file for complete search history.

(56) References Cited

U.S. PATENT DOCUMENTS

| | | | |
|---|---|---|---|
| 8,037,918 B2 * | 10/2011 | Wang | .................. H01L 21/6838 |
| | | | 414/737 |
| 9,966,357 B2 | 5/2018 | Hwang et al. | |
| 2007/0275544 A1 | 11/2007 | Maki et al. | |
| 2012/0267423 A1 | 10/2012 | Huang et al. | |

FOREIGN PATENT DOCUMENTS

TW 202215571 A 4/2022

* cited by examiner

*Primary Examiner* — James D Sells
(74) *Attorney, Agent, or Firm* — NZ Carr Law Office

(57) ABSTRACT

Embodiments of the present disclosure provide die pick and place tools with an improved vacuum tip that can perform attachment and detachment of an integrated circuit die without deforming dies. In one embodiment, a vacuum tip for transporting an integrated circuit die is provided. The vacuum tip includes a body having a top surface and a bottom surface, a plurality of grooves formed in the top surface and into the body, wherein the grooves extend radially outward from a center point of the body. The vacuum tip also includes a channel in the body, wherein the channel extends from a bottom of the grooves through the body to the bottom surface of the body, and the channel and the body are substantially co-axial.

20 Claims, 10 Drawing Sheets

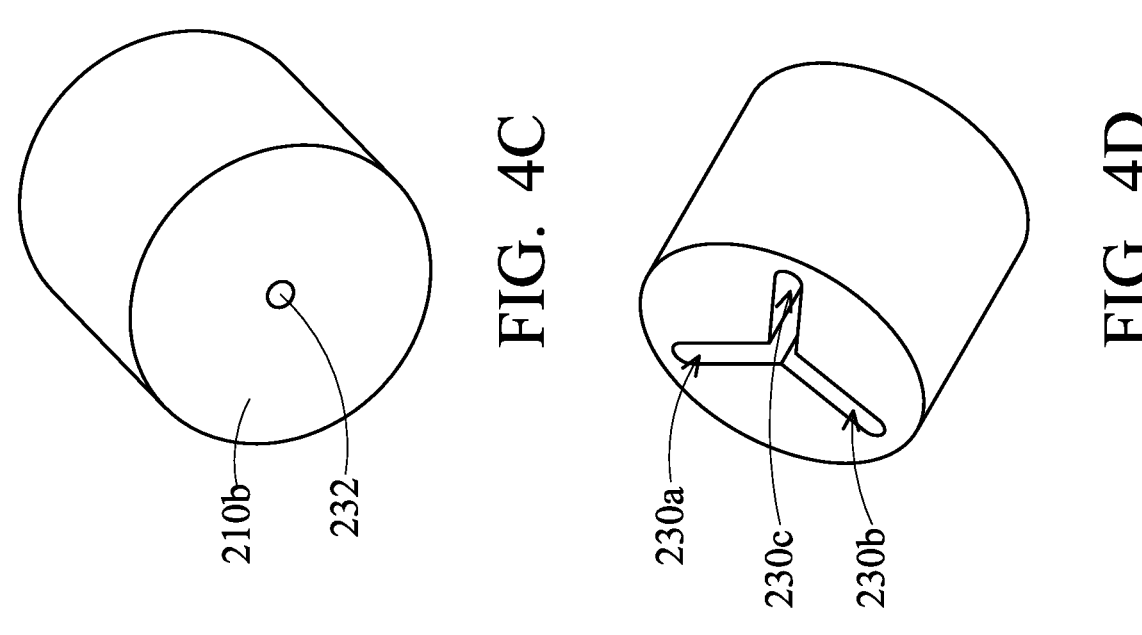
FIG. 4C
FIG. 4D
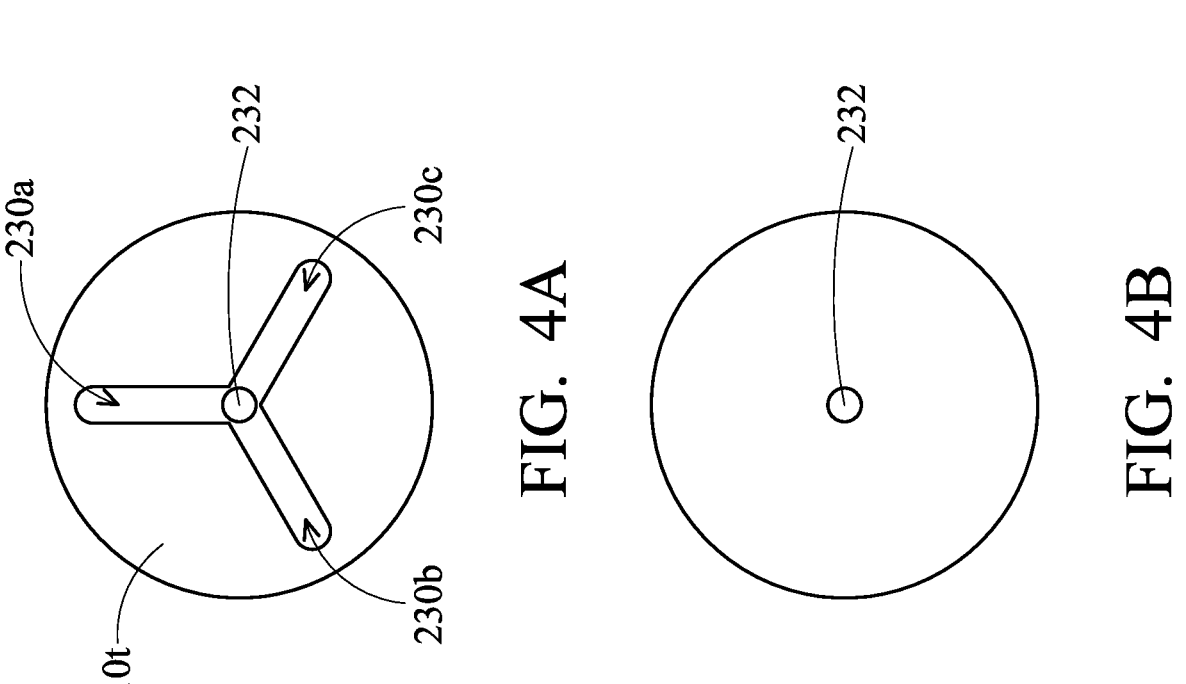
FIG. 4A
FIG. 4B

VACUUM TIP ASSEMBLY FOR USE IN PICK-AND-PLACE TOOL

BACKGROUND

A common requirement for an advanced electronic circuit and particularly for circuits manufactured as integrated circuits (ICs) in semiconductor processes is the use of equipment to transport circuit dies for various operations. Vacuum "pick and place" tools are often used for transportation of circuit dies. The vacuum pick and place tool typically uses a tip to make contact to the die and apply a vacuum to attach the die to the tool. The die may be moved to other tools for various manufacturing processes. Once the die is placed in another processing tool or storage area, the vacuum is released and the tip is moved away from the die.

As die sizes shrink and semiconductor processes advance, the thickness of wafers and the resulting completed integrated circuit dies is also falling. As a consequence, the use of the conventional pick and place tools may result in deformation of the die when it is attached to the vacuum tip. This deformation may result in non-uniform processing. Therefore, an improved pick and place tool that can address the above-mentioned issues is needed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 4A is a top view of the vacuum tip of FIG. 3A, in accordance with some embodiments.

FIG. 4B is a bottom view of the vacuum tip of FIG. 4A, in accordance with some embodiments.

FIG. 4C is a perspective view of the vacuum tip of FIG. 4B, in accordance with some embodiments.

FIG. 4D is a perspective view of the vacuum tip of FIG. 4A, in accordance with some embodiments.

DETAILED DESCRIPTION

Figure 1:
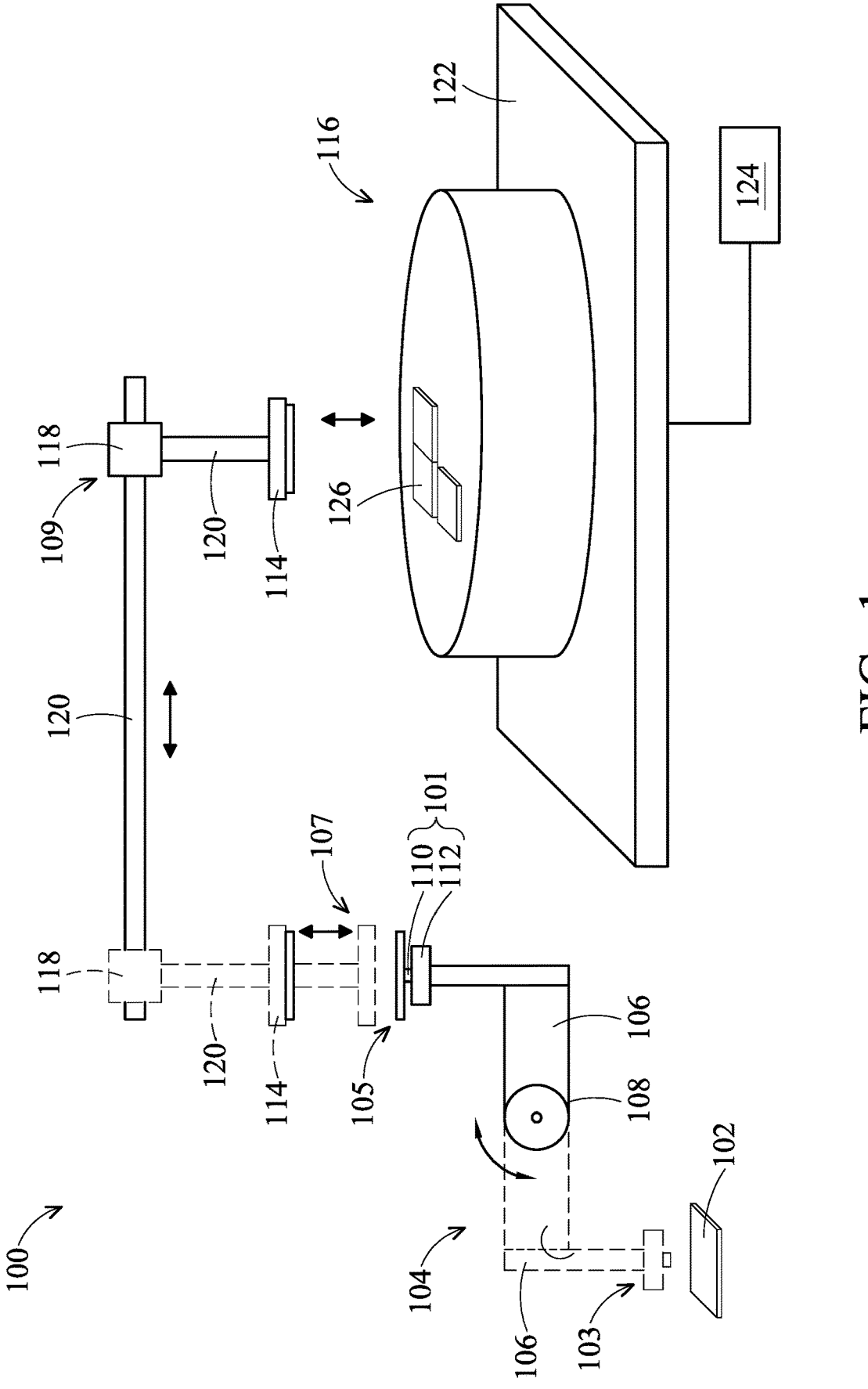
FIG. 1 illustrates a schematic view of a pick-and-place tool, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "over," "on," "top," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Embodiments of the present disclosure provide novel die pick and place tools with an improved vacuum tip that can perform attachment and detachment of an integrated circuit die without deforming dies, particularly dies with thickness of less than about 10 mils. The novel die pick and place tools may be used with processes where dies are picked and placed using vacuum tools, for example for transporting the dies to a station for applying flux to solder bumps on a bottom surface of a die. In various embodiments, the vacuum tip is configured to make physical contact with a surface area of a die. The vacuum tip has a plurality of grooves formed in a top surface of the vacuum tip. The grooves are fluidly connected to a vacuum channel which extends through the body of the vacuum tip. The grooves and the vacuum channel are in fluid communication with a vacuum source. The vacuum tip has an increased contact surface area that can provide greater and even support to the contact surface area of the die. As a result, horizontal deformation of the die is avoided. The vacuum tips of the embodiments of this disclosure may be used for any process where pick and place operations are performed, such as packaging, die stacking, solder bump and solder flux, etc. Various aspects of the embodiment will be discussed in more detail below.

FIG. 1 illustrates a schematic view of a pick-and-place tool 100 in accordance with some embodiments of the present disclosure. The pick-and-place tool 100 may be used during the manufacturing of integrated circuits, which often involves bonding of device dies to processed wafers, such as a processed wafer 116. In a typical bonding process, a device die 102 is first picked up by a flipper, such as a flipper 104, and then transported to one or more bond heads 114 (only one is shown). The flipper 104 is operable to pick up device dies one-by-one from a wafer (not shown) that has already been sawed into dies. While not shown, the flipper 104 is configurable to perform movements in at least one "horizontal" direction (x-direction) and in the "vertical" direction (z-direction). The wafer may be a device wafer, and the device die 102 may include integrated circuit devices (such as transistors) therein.

The flipper 104 has an arm 106 coupled to an actuator 108. The actuator 108 may rotate the arm 106 about the axis of the actuator 108 and move the arm 106 back and forth between a first position 103 (where the device die 102 is picked up) and a second position 105 (where the die 102 is released). A vacuum tip assembly 101 is removably coupled to the arm 106 of the flipper 104. The vacuum tip assembly 101 generally includes a vacuum tip 110 and a mounting support 112. Application of a vacuum produced by a vacuum pump (not shown) causes the vacuum tip 110 to pick up the device die 102. The flipper 104 shown in dotted lines illustrates the position of the arm 106 and the flipper 104 for picking up the device die 102, while the flipper 104 in solid lines illustrate the position of the same flipper 104 for releasing flipped device die 102.

The bond heads 114 are vertically movable with respect to the flipper 104 and are used to move the device die 102 from the flipper 104 to the processed wafer 116. The processed wafer 116 may have a plurality of integrated circuit dies (e.g., die 126) formed thereon. If desired, the processed wafer 116 may be replaced with a carrier wafer. The bond head 114 may be a vacuum head capable of picking up die (e.g., the device die 102) through vacuum force. The bond head 114 may be coupled to a moving member 118 through a stem 120. The moving member 118 is operable to move the bond head 114 towards the flipper 104 and pick up the flipped device die 102 from the flipper 104. The moving member 118 can move the bond head 114 along a guide rail 121 between a third position 107 (where the flipped device die is released from the flipper 104) and a fourth position 109 directly above the processed wafer 116. The processed wafer 116 may be disposed on a substrate support 122. The substrate support 122 may be connected to a heater 124, which imparts local heating to the processed wafer 116. A control unit (not shown) may be electrically connected to the flipper 104, the bond head 114, the moving member 118, and the heater 124 so that the actions of the bond head 114 and the flipper 104 may be controlled and synchronized with the movement of the wafer and the processed wafer.

In operation, the flipper 104 is directed to move the arm 106 to the first position 103 where dies are to be picked up from a wafer (not shown). The wafer may be moved in the X and Y directions so that each one of dies (e.g., the die 102) in wafer is moved to directly under the flipper 104 one at a time. The flipper 104 may flip or move the arm 106 through the actuator 108 so that the vacuum tip 110 is facing the front side of the device die 102. Then, the flipper 104 move towards and contact the device die 102 with the vacuum tip 110. Once the device die 102 is secured to the vacuum tip 110, the flipper 104 move backwards and the arm 106 may be flipped or moved again, with the backside of the picked-up die 102 facing up, from the first position 103 to the second position 105. Next, the moving member 118 moves the bond head 114 towards the flipped device die 102 and contact the backside of the flipped device die 102. Once the flipped device die 102 is secured to the bond head 114, vacuum applied to the front side of the device die 102 (by the flipper 104) is turned off, and the moving member 118 moves the bond head 114 backwards, with the front side of the device die 102 facing down. The moving member 118 moves the bond head 114 from the third position 107 to the fourth position 109, where the device die 102 is to be placed on the processed wafer 116. In the meantime, the flipper 104 may continue to pick up dies from the wafer in a similar fashion as discussed above. The moving member 118 moves the bond head 114 (carrying the device die 102) downward towards dies (e.g., die 126) on the processed wafer 116. After a plurality of device dies are placed on the processed wafer 116, a thermal process may be performed (by the heater 124) so that the device dies (e.g., device die 102) are bonded to the corresponding die (e.g., die 126) on the processed wafer 116. The dies may be bonded together through fusion or hybrid bonding technologies, such as an insulator-to-insulator, a metal-to-metal, or an insulator-to-metal bonding process. The dies can be bonded face-to-face (F2F) or face-to-back (F2B). In a F2F bonding configuration the active surfaces of the dies are bonded together, whereas in a F2B bonding configuration, an active surface of one die is bonded to a back surface of another die. After completion of bonding, the bond head 114 is moved away from the processed wafer 116 by the moving member 118, and the moving member 118 moves the bond head 114 back to the third position 107 to pick up another die from the flipper 104.

Figures 2A, 2B:
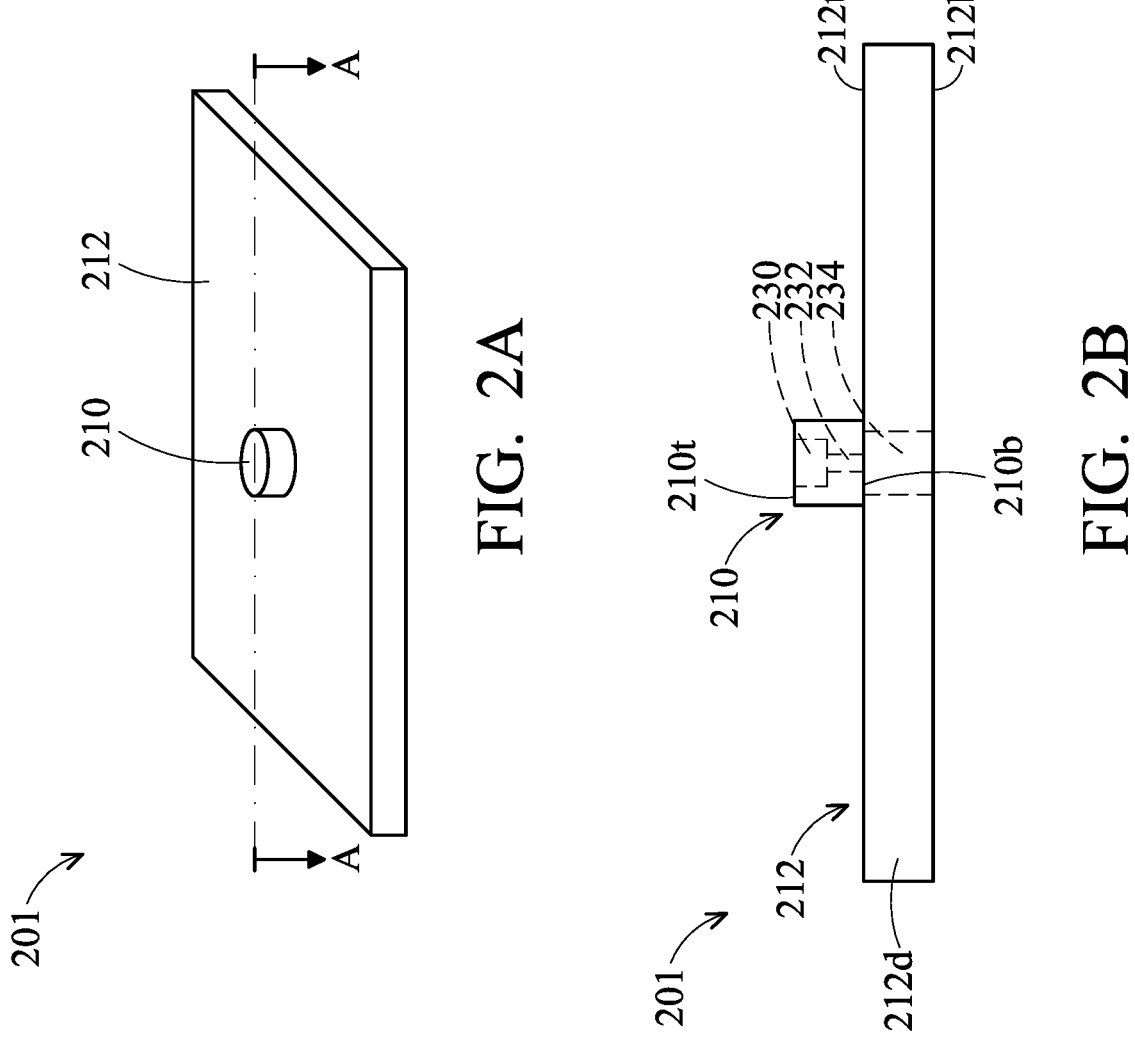
FIG. 2A is a perspective view of a vacuum tip assembly, in accordance with some embodiments of the present disclosure.
FIG. 2B is a cross-sectional view of the vacuum tip assembly taken along the plane A-A shown in FIG. 2A.

FIG. 2A is a perspective view of a vacuum tip assembly 201 in accordance with some embodiments of the present disclosure. The vacuum tip assembly 201 can be used to replace a vacuum tip assembly of a flipper, such as the flipper 104 of the pick-and-place tool 100 shown in FIG. 1. The vacuum tip assembly 201 generally includes a vacuum tip 210 and a mounting support 212. The vacuum tip 210 may be referred to as a pick-up head or nozzle head. The vacuum tip 210 is removably attached to the mounting support 212. In some embodiments, the vacuum tip 210 is permanently attached to the mounting support 212 by a glue or the like. The vacuum tip 210 may be disposed at the center of the mounting support 212. The mounting support 212 may be a flat plate in any suitable shape, such as a square, a rectangular, or a round shape, etc. In one exemplary embodiment, the mounting support 212 is a square-shaped plate having a dimension of 4 mm by 4 mm. However, these dimensions should not be construed as limiting and may vary depending on the size of the flipper 104.

FIG. 2B is a cross-sectional view of the vacuum tip assembly 201 taken along the plane A-A shown in FIG. 2A. The vacuum tip 210 has a top surface 210*t* and a bottom surface 210*b* opposing the top surface 210*t*. The mounting support 212 has a top surface 212*t* and a bottom surface 212*b* opposing the top surface 212*t*. The bottom surface 210*b* of the vacuum tip 210 is attached to the top surface 212*t* of the mounting support 212. As will be discussed in more detail in FIGS. 3A-3B, the vacuum tip 210 may have a plurality of grooves 230 formed in the top surface 210*t* of the vacuum tip 210. The grooves 230 extend outwardly from the center of the vacuum tip 210 and are arranged in a manner to provide equal vacuum force to the device die. In some embodiments, each of the grooves 230 has one end merged or connected to each other.

The vacuum tip 210 also has a channel 232 extending vertically through a portion of the vacuum tip 210 and exposed at the bottom surface 210*b* of the vacuum tip 210. The channel 232 has a first end connecting to a bottom of the grooves 230 and a second end connecting to the bottom surface 210*b* of the vacuum tip 210. The channel 232 and the grooves 230 are fluidly connected. While one channel 232 is shown, two or more channels may be provided and fluidly connected to each groove 230 in some embodiments. Each groove 230 has a length greater than the diameter of the channel 232. In most embodiments, the top surface 210_t_ of the vacuum tip 210 is less than a cross-sectional area of a die. However, the top surface 210_t_ of the vacuum tip 210 may vary with the size of the die and the semiconductor processing technology being used to manufacture the die. In some embodiments, the top surface 210_t_ of the vacuum tip 210 may have a cross-sectional area similar or corresponding to that of the die.

The mounting support 212 has a vacuum hole 234 extending from the top surface 212_t_ through the body 212_d_ to the bottom surface 212_b_ of the mounting support 212. The vacuum hole 234 is aligned with the channel 232 of the vacuum tip 210. The vacuum hole 234 is in fluid communication with a vacuum supply (not shown). The vacuum hole 234, the channel 232, and the grooves 230 are fluidly connected and form a vacuum path for the vacuum tip assembly 201. The vacuum hole 234 may have an inner diameter less than the outer diameter of the vacuum tip 210. In some embodiments, the inner diameter of the vacuum hole 234 may correspond to an inner diameter of the channel 232 of the vacuum tip 210. The mounting support 212 may be formed of metals, alloys, plastics, or composite materials containing one or more of those materials.

Figures 3A, 3B:
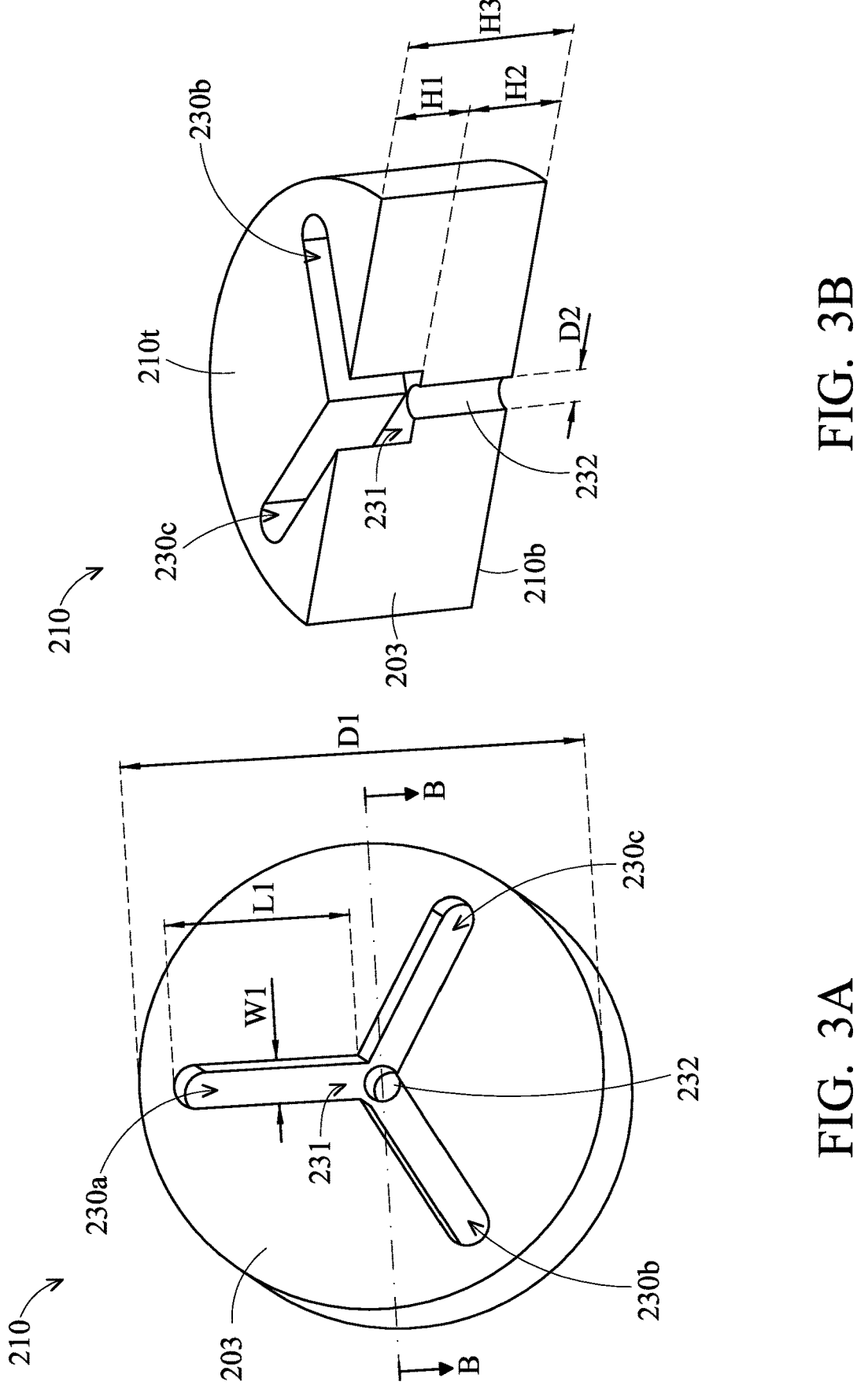
FIG. 3A is a perspective view of the vacuum tip of FIG. 2A, in accordance with some embodiments.
FIG. 3B is a perspective view of the vacuum tip of FIG. 3A taken the plane B-B shown in FIG. 3A.

FIG. 3A is a perspective view of the vacuum tip 210 of FIG. 2A, in accordance with some embodiments. FIG. 3B is a perspective view of the vacuum tip 210 of FIG. 3A taken the plane B-B shown in FIG. 3A. As shown in FIG. 3A, the vacuum tip 210 has a body 203 that is cylindrical in shape. The vacuum tip 210 has a plurality of grooves 230 formed in the top surface 210_t_ of the vacuum tip 210. The grooves 230 extend a thickness into the body 203 of the vacuum tip 210 and may connect to the channel 232, which is located at the center of the vacuum tip 210. The channel 232 extends from a bottom 231 of the grooves 230 through the body 203 and exposed at a bottom surface 210_b_ of the vacuum tip 210. The number of the grooves 230 may vary between 3 and 10. However, greater number of the grooves are contemplated depending on the surface area of the vacuum tip 210.

In various embodiments, the grooves 230 are symmetrically arranged with respect to a vertical line extending through a center point of the body 203 or the channel 232. The grooves 230 are equally spaced around the circumference of the body 203 or vacuum tip 210 so that an approximately equal vacuum force can be provided to the front side of the device die. In one exemplary embodiment shown in FIG. 3A, three grooves 230_a_, 230_b_, 230_c_ are provided. In such cases, the grooves 230_a_, 230_b_, 230_c_ are separated 120 degrees apart from each other. The grooves 230_a_, 230_b_, 230_c_ may share a common ground. In some embodiments, the bottoms of each groove 230_a_-230_c_ are co-planar. The grooves 230_a_, 230_b_, 230_c_ may extend radially and outwardly from the channel 232. The grooves 230_a_, 230_b_, 230_c_ may have their first end merged or connected to one another or overlapped with the channel 232. The second end (i.e., the distal end away from the channel 232) of each groove 230_a_, 230_b_, 230_c_ may terminate at or near the periphery of the body 203 or the vacuum tip 210. The grooves 230_a_, 230_b_, 230_c_ therefore form an enclosed fluid space. In some embodiments, the second end of each groove 230_a_, 230_b_, 230_c_ is constructed to have a semicircle-shaped edge, a square-shaped edge, or polygon-shaped edge.

The material between the grooves 230 forms a planar contact surface that will contact the surface of the device die and provide the needed mechanical support to the die while the vacuum is applied. Thus, when the vacuum is applied to the vacuum tip 210, the device die is supported, and the device die will not deform or warp. The surface area of the vacuum tip 210 that may come into contact with the device die (i.e., the planar contact surface having no grooves 230_a_, 230_b_, 230_c_, or stated differently, the top surface 210_t_ of the vacuum tip 210 to be in physical contact with the device die) is about 30% to about 80% of the total surface area of the top surface 210_t_ (which is calculated as if the grooves 230_a_-230_c_ were not formed). Comparing to conventional vacuum tips having a ring-shaped contact surface, the vacuum tip 210 provides an increased contact surface area for the device die. This percentage may vary depending on the amount of the grooves and/or the dimension of the grooves formed in the top surface 210_t_ of the vacuum tip 210.

In some embodiments, the vacuum tip 210 may have an outer diameter D1 in a range of about 2 mm to about 12 mm. Each groove 230_a_, 230_b_, 230_c_ may have a width W1 in a range of about 0.1 mm to about 0.6 mm, and a length L1 in a range of about 0.5 mm to about 6 mm. The length L1 and the outer diameter D1 may have a ratio (L1:D1) in a range of about 1:13 to about D1 may have a ratio (L1:D1) in a range of about 1:2 to about 1:13. The channel 232 may have a diameter D2 (FIG. 3B) in a range of about 0.1 mm to about 0.6 mm. The width W1 may be greater, the same, or less than the diameter D2. The grooves 230 extend a thickness into the body 203 of the vacuum tip 210. The thickness may have a height H1 measuring from the top surface 210_t_ to the bottom of the grooves 230_a_, 230_b_, 230_c_. In some embodiments, the height H1 is in a range of about 0.2 mm to about 2 mm. The channel 232 may have a height H2 measuring from the bottom of the grooves 230_a_, 230_b_, 230_c_ to the bottom surface 210_b_ of the vacuum tip 210. The vacuum tip 210 may have a height H3 measuring from the top surface 210_t_ to the bottom surface 210_b_ of the vacuum tip 210. The height H1 may be greater or less than the height H2. In one embodiment, the height H1 is less than the height H2 and may have a ratio (H1:H2) in a range of about 1:4 to about 1:40. The height H1 and the height H3 may have a ratio (H1:H3) in a range of about 1:5 to about 1:50.

The vacuum tip 210 may be formed of any material suitable for contacting device dies. Examples of suitable materials includes metals (e.g., aluminum), alloys, plastics, stainless steel, or composite materials containing one or more of those materials, or thermoplastics that are suitable for contacting device dies, for example polyamide (PA), polyethylene (PE), polyaryletherketone (PEAK), polyetheretherketone (PEEK), thermoplastic polyimide resin (TPI), ceramic, or rubber, etc.

FIG. 4A is a top view of the vacuum tip 210 of FIG. 3A, in accordance with some embodiments. FIG. 4B is a bottom view of the vacuum tip 210 of FIG. 4A, in accordance with some embodiments. FIG. 4C is a perspective view of the vacuum tip 210 of FIG. 4B, in accordance with some embodiments. FIG. 4D is a perspective view of the vacuum tip 210 of FIG. 4A, in accordance with some embodiments. While the vacuum tip 210 is shown in cylindrical shape, any suitable shapes are contemplated. For example, the vacuum tip 210 may have a round shape, a square shape, or a polygon shape.

Figure 5:
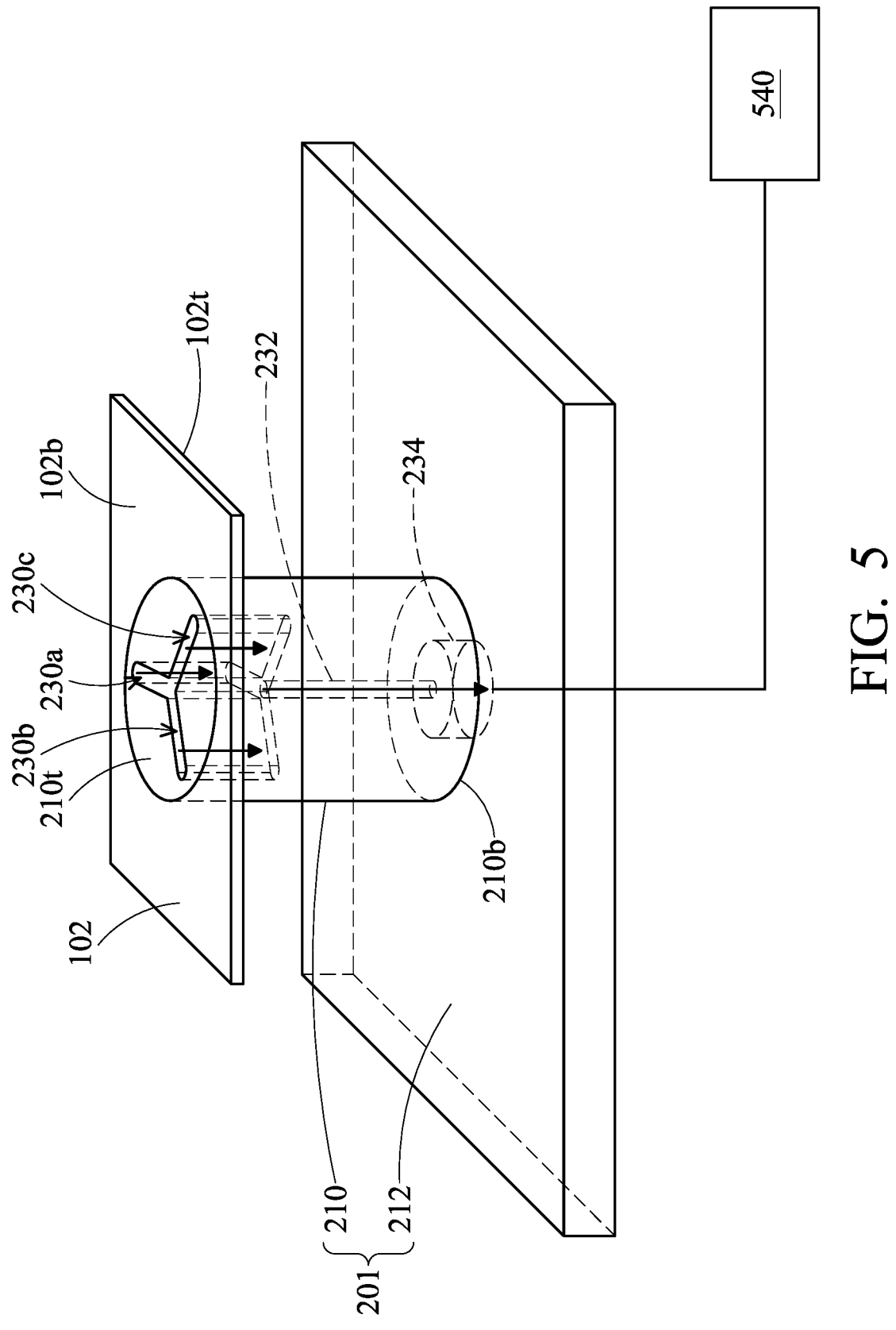
FIG. 5 illustrates a schematic view of the use of the vacuum tip assembly in picking the device die, in accordance with some embodiments.

FIG. 5 illustrates a schematic view of the use of the vacuum tip assembly 201 in picking the device die 102, in accordance with some embodiments. As can be seen, the top surface 210_t_ of the vacuum tip 210 contacts the device die 102 during the pick-and-place operation. After the contact is made, vacuum force (indicated by arrows) is applied to secure the device die 102 to the vacuum tip 210. The device die 102 remains in contact with the top surface 210*t* of the vacuum tip 210 due to the vacuum force supplied from a vacuum source 540. The downward vacuum force is exerted through the vacuum hole 234, the channel 232, the grooves 230*a*, 230*b*, 230*c* and thus to the top surface 102*t* of the device die 102. The vacuum force is of sufficient strength to hold the device die 102 securely to the vacuum tip 210. When the device die 102 is to be released from the vacuum tip 210, as the stage shown in FIG. 5, a bond head (e.g., the bond head 114 shown in FIG. 1) makes a contact with the bottom surface 102*b* of the device die 102, and the vacuum force from the vacuum source 540 is removed so that the vacuum tip 210 is able to move away from the device die 102 without further movement of the device die 102. The symmetric arrangement of the grooves 230*a*, 230*b*, 230*c* allows the vacuum tip 210 to provide even vacuum force to the device die 102 during the pick-and-place operation. Particularly, the physical support of the device die 102 at the top surface 102*t* prevents deformation or warp of the device die 102 when the vacuum is applied. As a result, the entire device die 102 remains in close contact with the vacuum tip 210 during the movement, a consistent vacuum force can be maintained between the vacuum tip 210 and the device die 102. In addition, since the entire device die 102 remains substantially flat before and during the attachment of the bond head, no scratch is made to the edge of the bond head nor the edge of the vacuum tip 210, leaving no crack particles or defects on the edge of the die. Thus, a uniform process result can be seen across the die, and the yield problem observed with the use of conventional vacuum tips are reduced or eliminated.

Figures 6A, 6B:
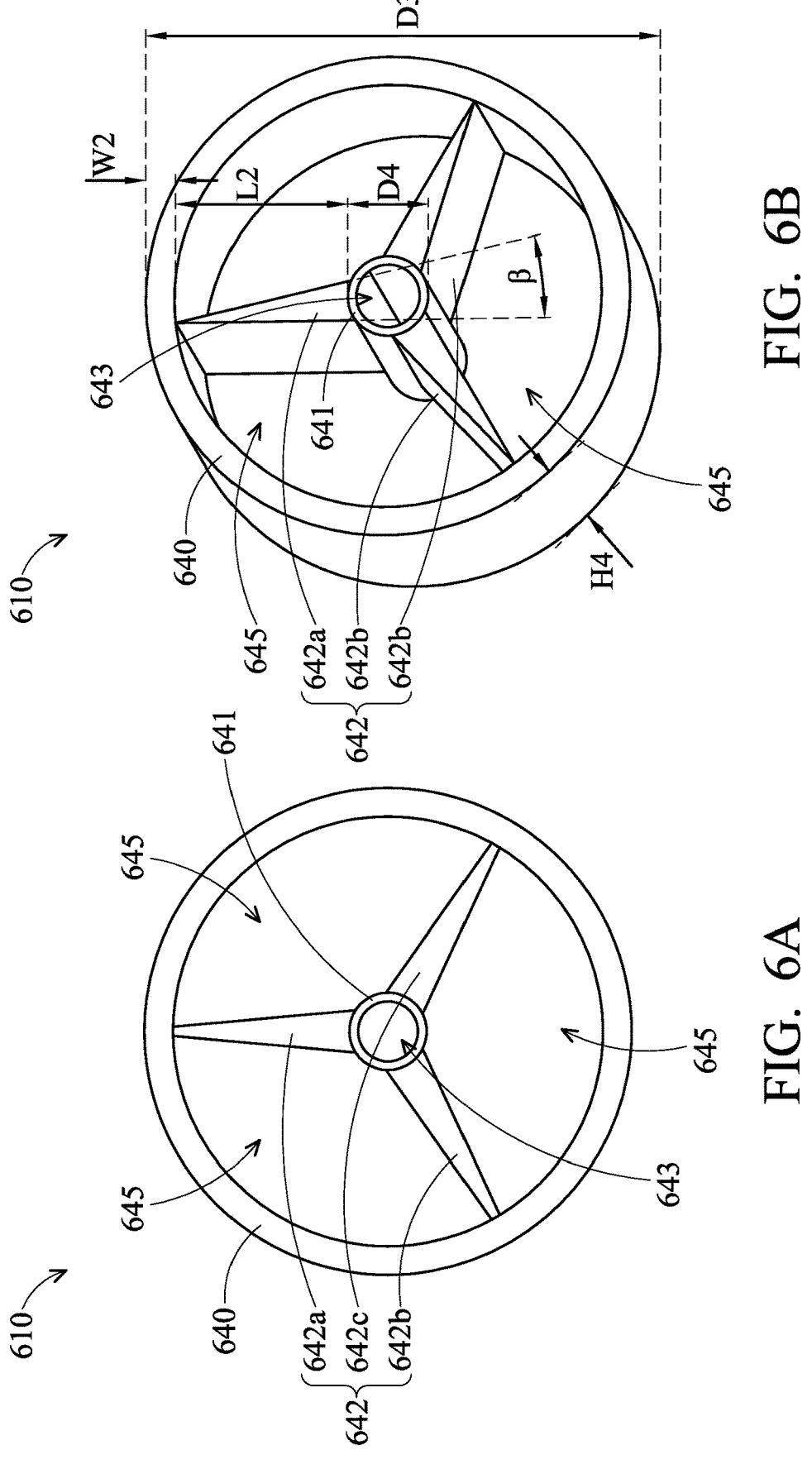
FIG. 6A is a top view of a vacuum tip, in accordance with some alternative embodiments.
FIG. 6B is a perspective view of the vacuum tip of FIG. 6A, in accordance with some embodiments.

In cases where a larger device die is involved in the pick-and-place operation, a vacuum tip with greater suction capability may be needed. FIG. 6A is a top view of a vacuum tip 610 in accordance with some alternative embodiments. FIG. 6B is a perspective view of the vacuum tip 610 of FIG. 6A, in accordance with some embodiments. The vacuum tip 610 can be used to replace a vacuum tip, such as the vacuum tip 110 of the flipper 104 shown in FIG. 1. In this embodiment, the vacuum tip 610 is constructed to have an outer ring body 640, an inner ring body 641 disposed within or radially inward of the outer ring body 640, and a plurality of support members 642 disposed, or extending radially between and in contact with the outer ring body 640 and the inner ring body 641. The outer and inner ring bodies 640, 641 are co-axial. The outer and inner ring bodies 640, 641 each has a top surface and a bottom surface opposing the top surface. The top surface of the outer and inner ring bodies 640, 641 are co-planar and are used to make contact with the device die. The bottom surface of the outer ring body 640 is coupled to a mounting support (not shown), such as the mounting support 212 shown in FIGS. 2A and 2B. In some embodiments, the bottom surface of the outer and inner ring bodies 640, 641 may not be co-planar. For example, the bottom surface of the inner ring body 641 may be at an elevation higher than the bottom surface of the outer ring body 640.

The support members 642 are in the form of a three-pointed star defined by a first support member 642*a*, a second support member 642*b*, and a third support member 642*c* extending outwardly from the inner ring body 641. In some embodiments, each of the first, second, and third support members 642*a*, 642*b*, 642*c* tapers distally and outwardly. Alternatively, each of the first, second, and third support members 642*a*, 642*b*, 642*c* may taper distally and inwardly. The first, second, and third support members 642*a*, 642*b*, 642*c* (collectively referred to as support members 642) are equally spaced around the circumference of the vacuum tip 610. The outer ring 640, the inner ring 641, and the support members 642 are co-planar. The top surfaces of the outer ring 640, the inner ring 641, and the support members 642 are to be in contact with the device die. The region within the inner ring body 641 forms vacuum port 643, while the regions defined by the outer ring body 640, the inner ring body 641, and the support member 642 form vacuum ports 645 for the vacuum tip 610. During the pick-and-place operation, the vacuum ports 643, 645 are both in fluid communication with a vacuum port, such as the vacuum hole 234 of the mounting support 212 in FIG. 2B, to provide vacuum force to the device die. The size of the vacuum hole 234 may vary in accordance with of the size of the outer ring body 640. In most cases, the vacuum hole 234 may correspond to at least the inner diameter of the outer ring body 640 to provide appropriate vacuum force to the device die. Since the support members 642 are symmetrically arranged within the outer ring body 640, an approximately equal vacuum force can be provided to the device die. Comparing to the vacuum tip 210, the vacuum tip 610 can provide greater suction force due to the increased surface area of the vacuum ports 643, 645. The presence of the support members 642 and the inner ring body 641 also allows the vacuum tip 610 to pick up a device die with a minimum support needed without deforming the device die.

In some embodiments, the vacuum tip 610 may have an outer diameter D3 in a range of about 2 mm to about 12 mm, and a height H4 in a range of about 1 mm to about 10 mm. Each support member 642 may have a length L2 in a range of about 0.5 mm to about 6 mm. The inner ring body 641 may have an inner diameter D4 (FIG. 6B) in a range of about 0.1 mm to about 0.6 mm. The outer ring body 640 may have a width W2 in a range of about 0.05 mm to about 0.3 mm. Each of the support members 642 is tapered and the opposing sidewalls of the support members 642 define a taper angle (acute angle) β. The taper angle β may be in a range of about 15 degrees to about 30 degrees. The greater the taper angle β is, the bigger the total surface area available for supporting a device die. Therefore, the taper angle β may vary to increase or decrease the total surface area provided by the support members 642.

Figures 7A, 7B:
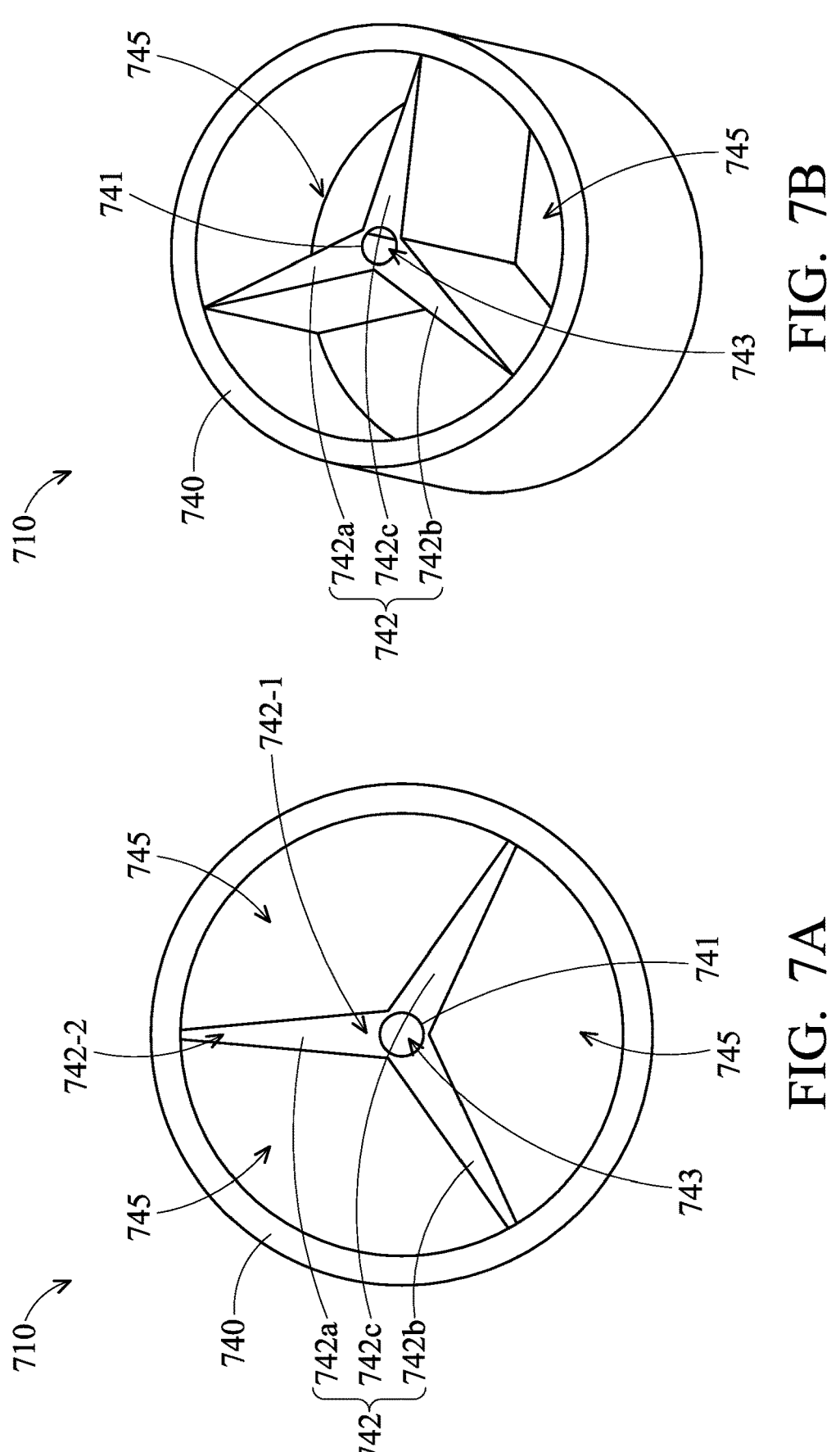
FIG. 7A is a top view of a vacuum tip, in accordance with some alternative embodiments.
FIG. 7B is a perspective view of the vacuum tip of FIG. 7A, in accordance with some embodiments.

FIG. 7A is a top view of a vacuum tip 710 in accordance with some alternative embodiments. FIG. 7B is a perspective view of the vacuum tip 710 of FIG. 7A in accordance with some embodiments. The vacuum tip 710 can be used to replace a vacuum tip, such as the vacuum tip 110 of the flipper 104 shown in FIG. 1. The vacuum tip 710 is similar to the vacuum tip 610 in FIG. 6A except that the inner ring body 641 is omitted. In this embodiment, the first, second, and third support members 742*a*, 742*b*, 742*c* (collectively referred to as support member 742) may each have a first end 742-1 and a second end 742-2, respectively. The first end of each of the first, second, and third support members 742*a*, 742*b*, 742*c* are bridged to define a vacuum port 743. The second end of each of the first, second, and third support members 742*a*, 742*b*, 742*c* are connected to the outer ring body 740. Likewise, the regions defined by the outer ring body 740 and the support members 742 form vacuum ports 745.

During the pick-and-place operation, the vacuum ports 743, 745 are both in fluid communication with a vacuum port, such as the vacuum hole 234 of the mounting support 212 in FIG. 2B, to provide vacuum force to the device die. Comparing to the vacuum tip 210, the vacuum tip 710 can provide greater suction force due to the increased surface area of the vacuum ports 743, 745. The presence of the support members 742 also allows the vacuum tip 710 to pick up a device die with a minimum support needed without deforming the device die.

Figures 8A, 8B:
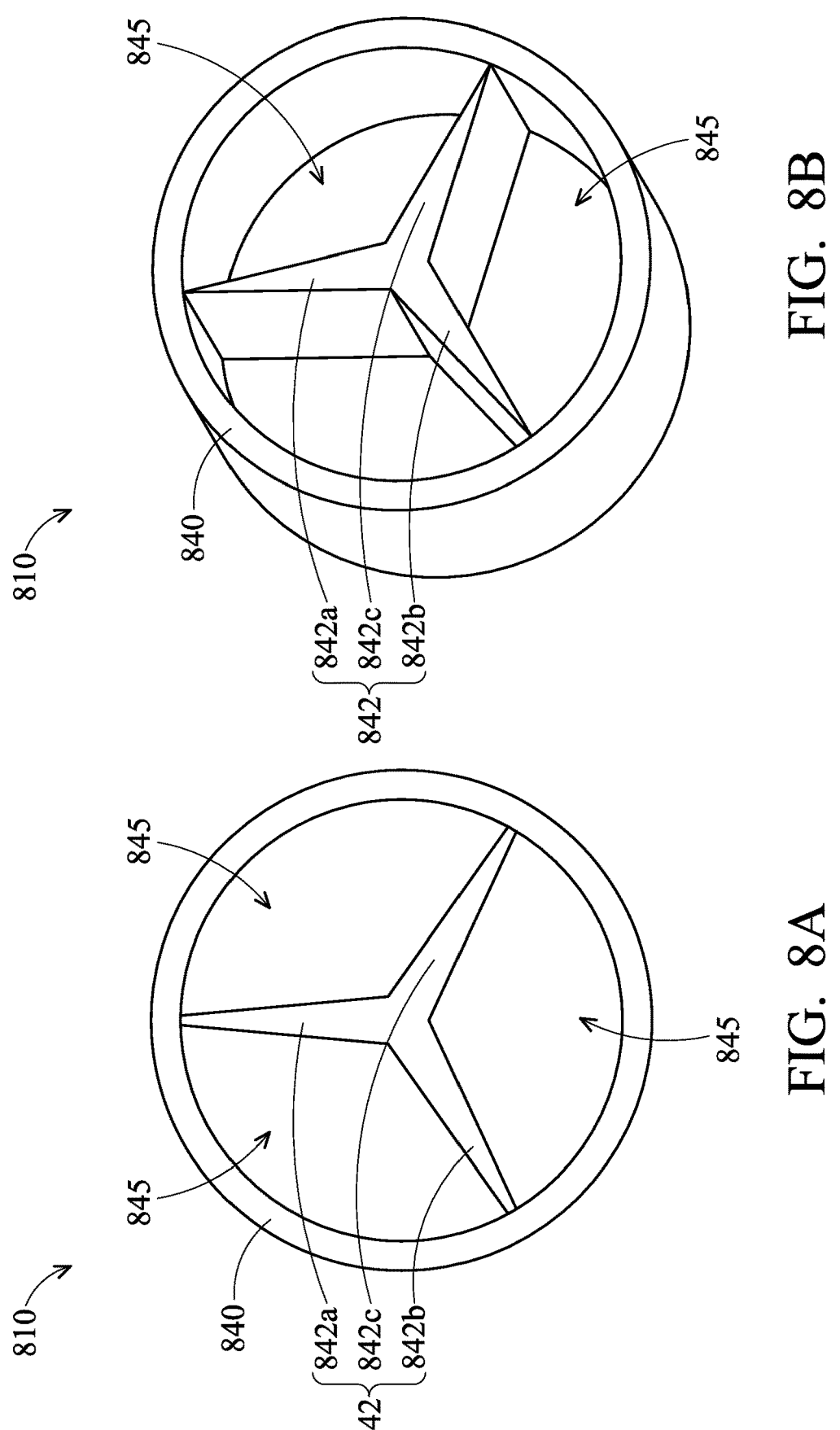
FIG. 8A is a top view of a vacuum tip in accordance with some alternative embodiments.
FIG. 8B is a perspective view of the vacuum tip of FIG. 8A, in accordance with some embodiments.

FIG. 8A is a top view of a vacuum tip 810 in accordance with some alternative embodiments. FIG. 8B is a perspective view of the vacuum tip 810 of FIG. 8A, in accordance with some embodiments. The vacuum tip 810 can be used to replace a vacuum tip, such as the vacuum tip 110 of the flipper 104 shown in FIG. 1. The vacuum tip 810 is similar to the vacuum tip 710 except that the three-pointed star support members 842 within the outer ring body 840 is solid formed with no vacuum port provided at the center of the vacuum tip 810. The regions defined between the outer ring body 840 and the support members 842a, 842b, 842c define vacuum ports 843 for the vacuum tip 810. During the pick-and-place operation, the vacuum ports 843 are in fluid communication with a vacuum port, such as the vacuum hole 234 of the mounting support 212 in FIG. 2B, to provide vacuum force to the device die.

Figures 9, 10:
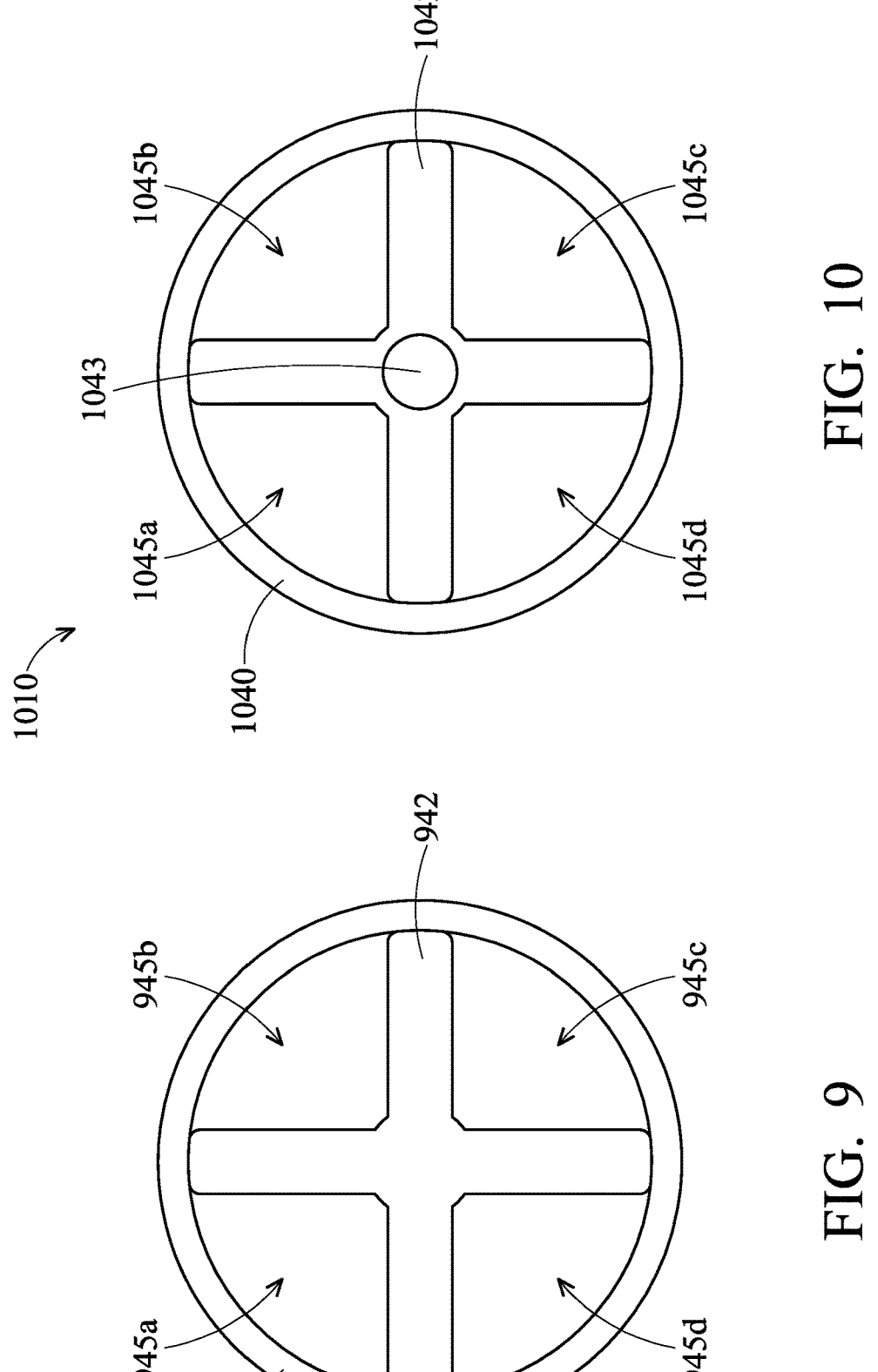
FIGS. 9-12 illustrate a top view of a vacuum tip, in accordance with various alternative embodiments.

FIGS. 9-12 illustrate a top view of a vacuum tip in accordance with various alternative embodiments. The embodiments shown in FIGS. 9-12 are similar to the embodiments of FIG. 6A-8A except that the support members and/or vacuum ports are arranged in a different pattern. The vacuum tips shown in FIGS. 9-12 may be made of the same material as the vacuum tip 210 discussed above. In FIG. 9, a vacuum tip 910 generally includes an outer ring body 940 and a cross-shaped support member 942 disposed inside the outer ring body 940. The top surfaces of the outer ring body 940 and the cross-shaped support member 942 provide a contact surface for a device die. The bottom surfaces of the outer ring body 940 is coupled to a mounting support (not shown), such as the mounting support 212 shown in FIGS. 2A and 2B. The regions defined between the outer ring body 940 and the cross-shaped support member 942 form vacuum ports 945a-945d. The vacuum ports 945 extend through the body of the vacuum tip 910 and are in fluid communication with a vacuum port, such as the vacuum hole 234 of the mounting support 212 in FIG. 2B. The vacuum ports 945a-d are symmetrically arranged with respect to the cross-shaped support member 942 to provide even vacuum force to the device die during the pick-and-place operation without deforming the device die.

The embodiment in FIG. 10 is similar to the vacuum tip 910 of FIG. 9 except that a center vacuum port 1043 is further provided at the center of the cross-shaped support member 1042 of the vacuum tip 1010. The regions defined between the outer ring body 1040 and the cross-shaped support member 1042 form vacuum ports 1045a-1045d. The vacuum ports 1043 and 1045a-1045d extend through the body of the vacuum tip 1010 and are in fluid communication with a vacuum port, such as the vacuum hole 234 of the mounting support 212 in FIG. 2B. The vacuum ports 1045a-d are symmetrically arranged with respect to the cross-shaped support member 1042 to provide even vacuum force to the device die during the pick-and-place operation without deforming the device die.

Figures 11, 12:
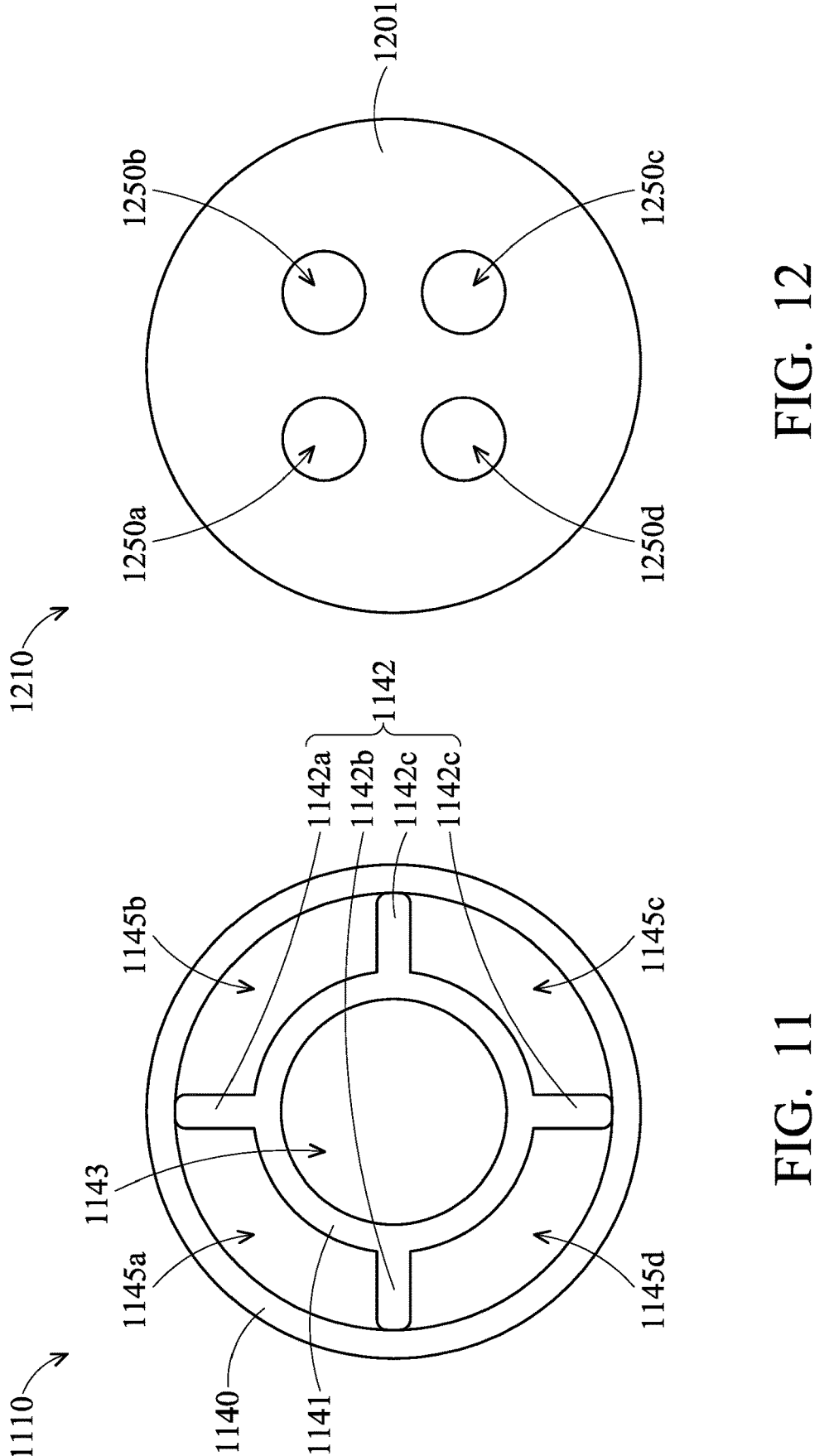

In FIG. 11, a vacuum tip 1110 generally includes an outer ring body 1140 and an inner ring body 1141 disposed inside the outer ring body 1140. The outer ring body 1140 and the inner ring body 1141 are co-axially arranged. The support members 1142a, 1142b, 1142c, 1142d (collectively referred to as support members 1142) are equally spaced around the circumference of the vacuum tip 1110 between the outer ring body 1140 and the inner ring body 1141. The region within the inner ring body 1141 forms a vacuum port 1143, and the regions defined by the outer ring body 1140, the inner ring body 1141, and the support members 1142 form vacuum ports 1145a-1145d. The vacuum ports 1143 and 1145a-1145d extend through the body of the vacuum tip 1110 and are in fluid communication with a vacuum port, such as the vacuum hole 234 of the mounting support 212 in FIG. 2B. The vacuum ports 1145a-d are symmetrically arranged to provide even vacuum force to the device die during the pick-and-place operation without deforming the device die.

In FIG. 12, a vacuum tip 1210 generally includes a body 1201 with a plurality of vacuum holes extending through the body 1201 of the vacuum tip 1210. In one exemplary embodiment, four vacuum holes 1250a, 1250b, 1250c, 1250d (collectively referred to as vacuum holes 1250) are provided. The vacuum holes 1250 are arranged in a similar fashion to a shirt button. While four vacuum holes 1250 are shown, more or less vacuum holes 1250 may be used so long as a symmetric arrangement is maintained. Likewise, the vacuum holes 1250 are in fluid communication with a vacuum port, such as the vacuum hole 234 of the mounting support 212 in FIG. 2B. The vacuum holes 1250 are symmetrically arranged to provide even vacuum force to the device die during the pick-and-place operation. The material between the vacuum holes 1250 forms a planar contact surface that will contact the surface of the device die and provide the needed mechanical support to the die while the vacuum is applied. Thus, when the vacuum is applied to the vacuum tip 1210, the device die is supported, and the device die will not deform or warp.

Embodiments of the present disclosure provide die pick and place tools with an improved vacuum tip that can perform attachment and detachment of an integrated circuit die without deforming dies. The novel die pick and place tools may be used with processes where dies are picked and placed using vacuum tools, for example for transporting the dies between stations. In some embodiments, the vacuum tip has grooves formed in a top surface of the vacuum tip. The grooves are symmetrically arranged and fluidly connected to a vacuum channel which extends through the body of the vacuum tip. The grooves and the vacuum channel are in fluid communication with a vacuum source. The material between the grooves forms a planar contact surface that will contact the surface of the die and provide the needed mechanical support to the die while the vacuum is applied. Thus, when the vacuum is applied to the vacuum tip, the die is supported, and the die will not deform or warp. In addition, since the entire die remains substantially flat before and during the attachment of a bond head, no scratch is made to the edge of the bond head nor the edge of the vacuum tip, leaving no crack particles or defects on the edge of the die. Thus, a uniform process result can be seen across the die, and the yield problem observed with the use of conventional vacuum tips are reduced or eliminated.

An embodiment is a vacuum tip for transporting an integrated circuit die. The vacuum tip includes a body having a top surface and a bottom surface, a plurality of grooves formed in the top surface and into the body, wherein the grooves extend radially outward from a center point of the body. The vacuum tip also includes a channel in the body, wherein the channel extends from a bottom of the grooves through the body to the bottom surface of the body, and the channel and the body are substantially co-axial.

Another embodiment is a vacuum tip for transporting an integrated circuit die. The vacuum tip includes an outer ring body, an inner ring body disposed radially inward of the outer ring body, wherein the outer ring body and the inner ring body being co-axial. The vacuum tip also includes a plurality of support members extending radially between and in contact with the outer ring body and the inner ring body, wherein the region within the inner ring body forms a first vacuum port, and the regions defined by the outer ring body, the inner ring body, and the support members form second vacuum ports.

A further embodiment is a pick-and-place tool. The pick-and-place tool includes a flipper and a vacuum head operable to pick up an object from the flipper. The flipper has a vacuum tip operable to pick up the object, wherein the vacuum tip includes a body having a top surface and a bottom surface, a plurality of grooves formed in the top surface and into the body, wherein the grooves extend radially outward from a center point of the body. The vacuum tip also includes a channel formed in the body and extending from a bottom of the grooves through the body to the bottom surface of the body. The flipper also includes an arm coupled to the vacuum tip and operable to move back and forth between a first position and a second position. The pick-and-place tool further includes a vacuum head operable to pick up the object from the flipper and move the object between a third position and a fourth position.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The invention claimed is:

1. A vacuum tip for transporting an integrated circuit die, comprising:
   a body having a top surface and a bottom surface;
   a plurality of grooves formed in the top surface and into the body, the grooves extending radially outward from a center point of the body, wherein portions of the top surface between the grooves form rigid planar contact surface regions; and
   a channel provided in the body and extending from a bottom of the grooves through the body to the bottom surface of the body, the channel and the body are substantially co-axial.

2. The vacuum tip of claim 1, wherein each of the plurality of the grooves has a first end connected to the channel at the center point and a second end terminated at or near a periphery of the body.

3. The vacuum tip of claim 2, wherein the second end of each groove has a semicircle-shaped edge, a square-shaped edge, or polygon-shaped edge.

4. The vacuum tip of claim 1, wherein the plurality of the grooves is equally spaced around a circumference of the body.

5. The vacuum tip of claim 1, wherein each of the plurality of the grooves has a first height and the channel has a second height greater than the first height.

6. The vacuum tip of claim 1, wherein the body is made of a metal, an alloy, a plastic, a rubber, a stainless steel, a ceramic, or a composite material.

7. The vacuum tip of claim 1, further comprising:
   a mounting support coupling to the bottom surface of the body, wherein the mounting support has a vacuum port extending through the mounting support and in fluid communication with the channel.

8. A pick-and-place tool, comprising:
   a flipper, comprising:
      a vacuum tip operable to pick up an object, comprising:
         a body having a top surface and a bottom surface;
         a plurality of grooves formed in the top surface and into the body, the grooves extending radially outward from a center point of the body, wherein portions of the top surface between the grooves form rigid planar contact surface regions; and
         a channel formed in the body and extending from a bottom of the grooves through the body to the bottom surface of the body; and
      an arm coupled to the vacuum tip and operable to move back and forth between a first position and a second position; and
   a vacuum head operable to pick up the object from the flipper and move the object between a third position and a fourth position.

9. The pick-and-place tool of claim 8, further comprising:
   a mounting support coupled to the vacuum tip, wherein the mounting support has a vacuum hole aligned with and fluidly connected to the channel of the vacuum tip.

10. The pick-and-place tool of claim 8, wherein the plurality of the grooves is symmetric with respect to a vertical line extending through a center point of the body.

11. The pick-and-place tool of claim 10, wherein each of the plurality of the grooves has a first end connected to the channel at the center point and a second end terminated at or near a periphery of the body.

12. The pick-and-place tool of claim 8, wherein the body is cylindrical in shape.

13. A pick-and-place tool, comprising:
   a flipper, comprising:
      a vacuum tip, comprising:
         a body having a top surface and a bottom surface;
         a plurality of grooves disposed in the top surface and into the body, the grooves extending radially outward from a center point of the body, wherein portions of the top surface between the grooves form rigid planar contact surface regions; and
         a channel disposed in the body and extending from a bottom of the grooves through the body to the bottom surface of the body, the channel and the body are substantially co-axial; and
      a vacuum head movable between a first position and a second position.

14. The pick-and-place tool of claim 13, the flipper further comprising:
   an arm coupled to the vacuum tip and movable between a third position and a fourth position.

15. The pick-and-place tool of claim 13, wherein the number of the plurality of grooves is three.

16. The pick-and-place tool of claim 13, wherein each groove extends a thickness into the body of the vacuum tip and the thickness has a first height, and the vacuum tip has a second height, wherein a ratio (first height:second height) is in a range of about 1:5 to about 1:50.

17. The pick-and-place tool of claim 13, wherein each groove extends a thickness into the body of the vacuum tip and the thickness has a first height, and the channel has a third height, wherein a ratio (first height:third height) is in a range of about 1:4 to about 1:40.

18. The pick-and-place tool of claim 13, further comprising:

a mounting support coupled to the vacuum tip, wherein the mounting support has a vacuum hole aligned with and fluidly connected to the channel of the vacuum tip.

19. The pick-and-place tool of claim 13, wherein the plurality of the grooves is symmetric with respect to a vertical line extending through a center point of the body.

20. The pick-and-place tool of claim 19, wherein each of the plurality of the grooves has a first end connected to the channel at the center point and a second end terminated at or near a periphery of the body.

\*   \*   \*   \*   \*